United States Patent [19]

Sakaki et al.

[11] Patent Number: 4,470,130
[45] Date of Patent: Sep. 4, 1984

[54] APPARATUS FOR LIFTING AND LOWERING A LINEAR TRACKING TONE ARM IN A RECORD PLAYER

[75] Inventors: Tetsuro Sakaki, Yokohama; Akira Yamanaka, Tokyo, both of Japan

[73] Assignee: Victor Company of Japan, Limited, Yokohama, Japan

[21] Appl. No.: 399,696

[22] Filed: Jul. 19, 1982

[30] Foreign Application Priority Data

Jul. 20, 1981 [JP] Japan .......................... 56-107589[U]

[51] Int. Cl.³ .......................... G11B 21/08; G11B 3/36
[52] U.S. Cl. ..................................... 369/230; 369/245
[58] Field of Search ............................... 369/230, 245

[56] References Cited

U.S. PATENT DOCUMENTS

| 3,661,397 | 5/1972 | Worth et al. | 369/230 |
| 3,675,932 | 7/1972 | Rabinow | 369/230 |
| 3,830,505 | 8/1974 | Rabinow | 369/230 |
| 4,171,817 | 10/1979 | Iyeta | 369/230 |
| 4,356,560 | 10/1982 | Ohnishi | 369/221 |

Primary Examiner—Steven L. Stephan
Attorney, Agent, or Firm—Lowe, King, Price & Becker

[57] ABSTRACT

A linear tracking tone arm having a stylus is pivotably mounted on a carriage slidably movable along a guide rod and has a hook extending in operative engagement with a pin on a swing arm slidably movable with the carriage along the guide rod. The guide rod is angularly movable about its own axis to turn the swing arm for lifting or lowering the linear tracking tone arm. A mechanism for turning the guide rod includes a solenoid, a plunger actuatable thereby, a cam pivotably movable by the plunger, and a rotation control arm coupled with the guide rod and held in engagement with the cam. The carriage supports thereon a guide frame for guiding a pin extending from the tone arm to cancel a tracking error when the stylus is led into the lead-out groove on a record disc.

1 Claim, 7 Drawing Figures

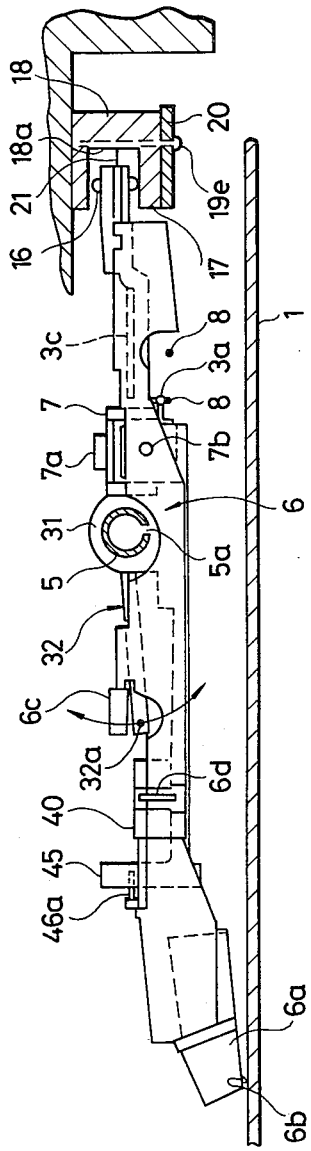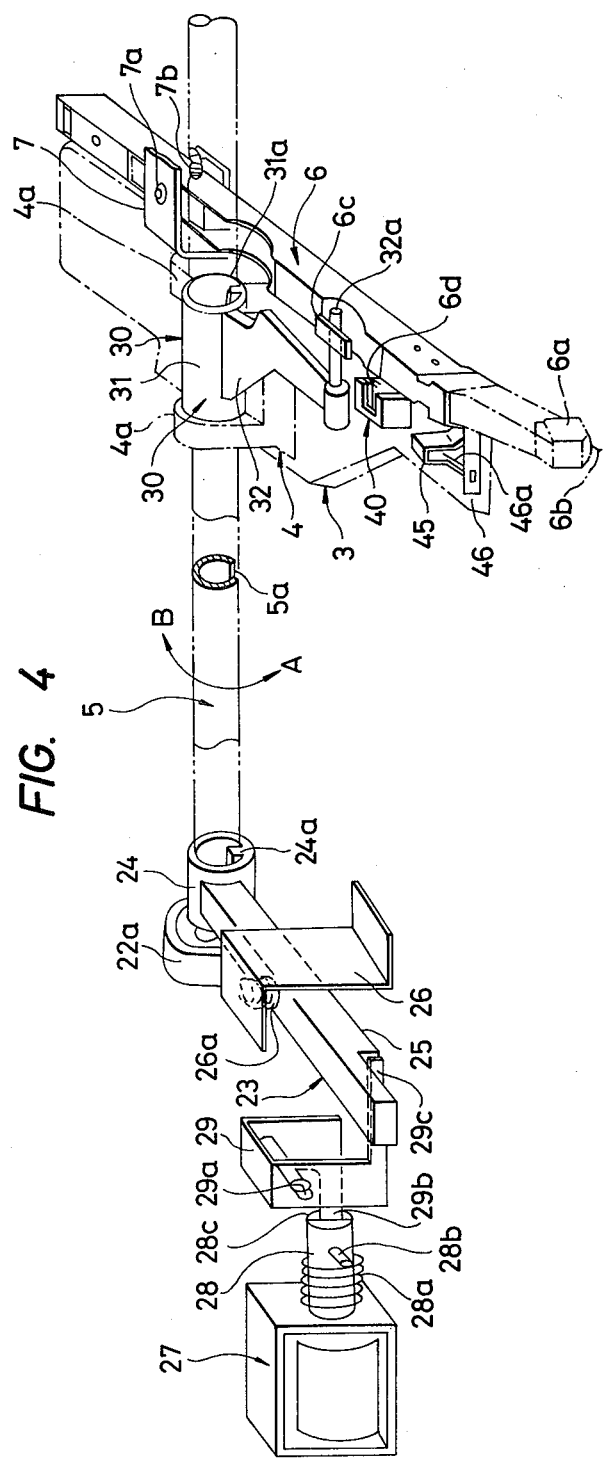

APPARATUS FOR LIFTING AND LOWERING A LINEAR TRACKING TONE ARM IN A RECORD PLAYER

BACKGROUND OF THE INVENTION

The present invention relates to a mechanism for automaticaly lifting and lowering a linear tracking tone arm into and out of contact with a record disc placed on a turntable in a phonograph or record player.

Various apparatus for lifting and lowering a linear tracking tone arm are known which is pivotably mounted on a carriage slidably movable along a guide rod and has a pickup stylus or needle engageable in sound reproducing relation to a record disc placed on a turntable. When the pickup stylus is aligned with the lead-in groove on the record disc, the linear tracking tone arm is lowered to bring the stylus into the groove. When the stylus is led into the lead-out groove, the tone arm is elevated to lift the stylus off the record disc. One known such apparatus comprises a solenoid mounted on the carriage for actuating a plunger to move up and down the linear tracking tone arm with respect to the carriage. With the solenoid and plunger installed on the carriage, a relatively large force is required to drive the carriage slidably along the guide rod. Since the solenoid is electrically connected to a control unit remote from the carriage through electric lead wires, the latter make complicated surroundings around the carriage and present resistance to sliding motion of the carriage along the guide rod, thus adding up to the load imposed on the carriage while being driven.

Another prior form of tone arm lifter comprises a pin projecting downwardly from the linear tracking tone arm and a swing plate hinged to a motor board or platform of the record player. The linear tracking tone arm can be lifted or lowered by moving the swing plate to act on the pin. Since, however, the swing plate extends substantially parallel to the guide rod, the swing plate takes up a relatively wide space within the record player, and the overall mechanism is rendered relatively complex.

SUMMARY OF THE INVENTION

It is an object of the present invention to provide a mechanism for automatically lifting and lowering a linear tracking tone arm supported on a carriage movable along a guide rod.

Another object of the present invention is to provide a tone arm lifting and lowering mechanism which allows a mechanism for driving a linear tracking tone arm to be relatively small in size and simple in construction, leaving a relatively wide space within a record player for possible other use.

Still another object of the present invention is to provide a tone arm lifting and lowering apparatus including an actuator mounted on a record player platform remotely from a linear tracking tone arm so that the latter is subjected to smaller impacts when elevated and lowered.

A still further object of the present invention is to provide a tone arm lifting and lowering apparatus which is reliable in operation, constructed of a reduced number of parts, and less costly to manufacture.

According to the present invention, an apparatus for lifting and lowering a linear tracking tone arm in a record player having a turntable, comprises a platform, a guide rod mounted on the platform for angular movement about its own axis, a carriage slidably movable along the guide rod, a drive mechanism for driving the carriage along the guide rod, a linear tracking tone arm supported through a universal joint on the carriage and having a pickup stylus engageable in sound reproducing relation with a record disc placed on the turntable, an actuator mechanism mounted on the platform for turning the guide rod about its own axis, and a swing arm slidably movable with the carriage along the guide rod and angularly movable with the guide rod, the swing arm being operatively connected with the linear tracking tone arm. The linear tracking tone arm can be lifted away from the record disc or lowered against the record disc in response to angular movement of the swing arm caused by the guide rod turned about its own axis by the actuator mechanism.

BRIEF DESCRIPTION OF THE DRAWINGS

The present invention will be described in detail by way of illustrative example with reference to the accompanying drawings, in which;

FIG. 3 is a side elevational view of a tone arm carriage;

FIG. 4 is a fragmentary perspective view of the tone arm lifting and lowering apparatus shown in FIG. 1;

DETAILED DESCRIPTION

Figure 1:
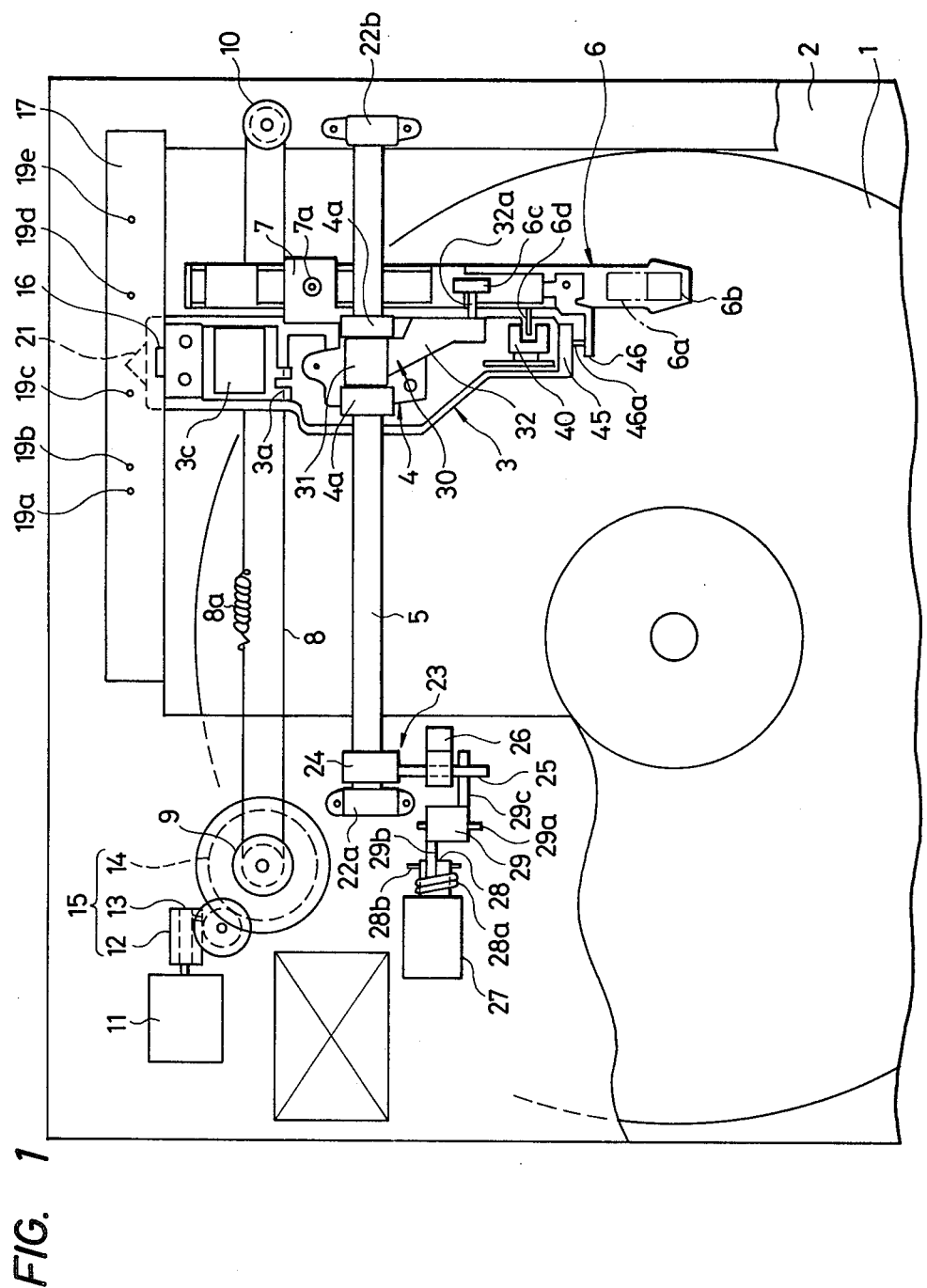
FIG. 1 is a fragmentary plan view of a phonograph or record player having a apparatus for automatically lifting and lowering a linear tracking tone arm.
Figure 2:
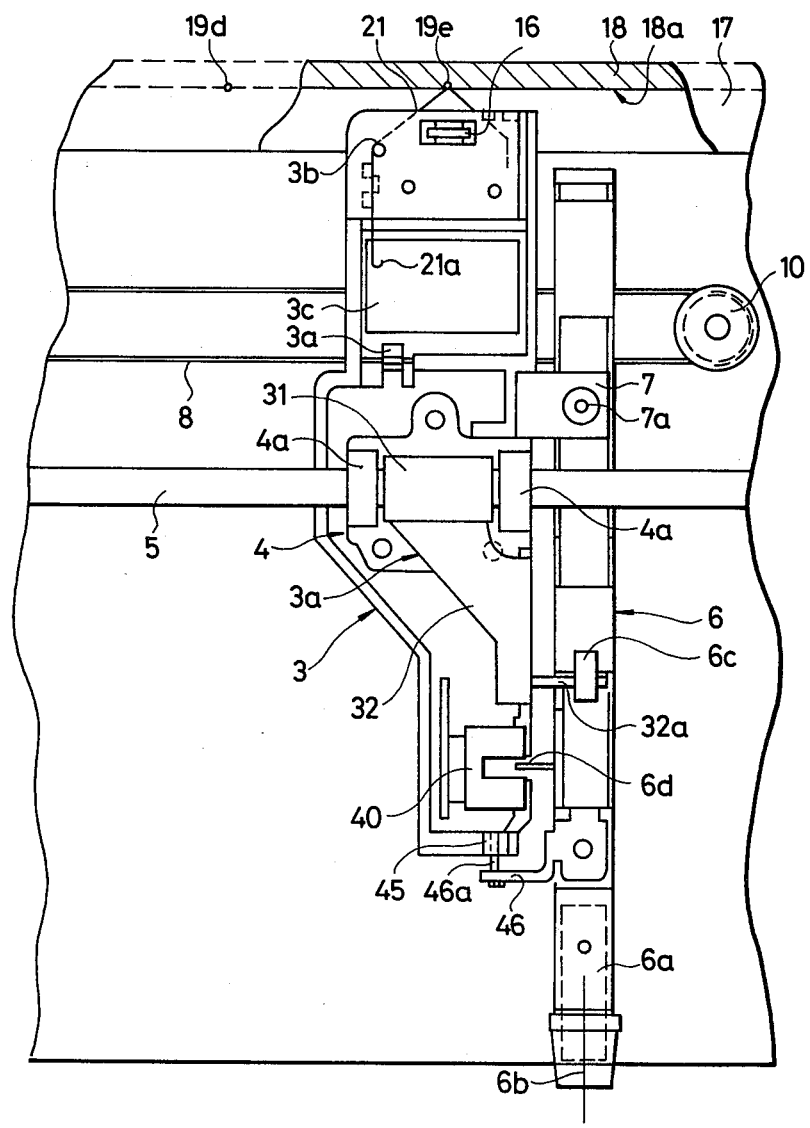
FIG. 2 is an enlarged fragmentary plan view of a carriage and a tone arm supported thereon.

As shown in FIG. 1, a phonograph or record player comprises a motor board or platform 2 on which there is rotatably mounted a turntable for supporting thereon a record disc 1. The record disc 1 is rotated at a selected speed when the turntable rotates about its own axis. As shown in FIGS. 1, 2 and 4, a carriage 3 has on its upper surface a guide plate 4 having a pair of spaced bearings 4a, 4a through which loosely extends a tubular or solid guide rod 5 of circular cross section. The carriage 3 is thus movable along the guide rod 5 in hanging relation thereto. The carriage 3 also has a tone arm support 7 extending laterally alongside of the guide rod 5 and supporting a linear tracking tone arm 6 through a universal joint mechanism. The universal joint mechanism includes a vertical shaft 7a and a horizontal shaft 7b on which the linear tracking tone arm 6 is mounted. The linear tracking tone arm 6 is angularly movable about the horizontal shaft 7b in a vertical plane, so that a pickup stylus or needle 6b of a cartridge 6a on the tone arm 6 can be moved down toward or up away from the record disc 1 when the pickup stylus 6b reaches a lead-in groove or lead-out groove on the record disc 1. The linear tracking tone arm 6 is also angularly movable about the vertical shaft 7a in a horizontal plane for a small angular interval, so that as the carriage 3 slides along the guide rod 5, the pickup stylus 6b will traverse the sound groove on the record disc 1 in the radial direction.

The carriage 3 is slidable along the guide rod 5 by a cable 8 having ends connected together through a tension spring 8a and extending around a pair of spaced pulleys 9, 10 and parallel to the guide rod 5. One of the parallel runs of the cable 8 is wound around a projection 3a extending from the carriage 3. When the cable 8 is driven, therefore, the carriage 3 slides along the guide rod 5. A motor 11 is mounted on the platform 2 and operatively coupled to the pulley 9 through a train of gears 12, 13, 14 which serve as a speed reducer 15. The pulley 9 is thus rotatable at a predetermined speed in response to energization of the motor 11.

The carriage 3 has on its rear end a roller 16 rotatably supported as shown in FIG. 3. The roller 16 is rollingly movable in a horizontal track channel 17 fixed to the platform 2 and extending along the guide rod 5 when the carriage 3 moves along the guide rod 5. The carriage 3 is prevented by the roller 16 disposed in the track channel 17 from being angularly moved about the guide rod 5. Thus, the carriage 3 is always maintained at a constant height with respect to the record disc 1 while moving on the guide rod 5.

The horizontal track channel 17 includes a longitudinal vertical wall 18 to which a plurality of vertical pin electrodes 19a through 19e are attached in spaced relation at intervals along the wall 18, as best shown in FIG. 1. In FIGS. 2 and 3, the pin electrodes 19a through 19e have portions exposed on a surface 18a of the wall 18 toward the carriage 3. The stylus 6b is positionally related to these pin electrodes 19a through 19e such that the pin electrodes 19a-19e come into action when the stylus 6b reaches certain positions on the record disc 1. Thus, the electrode 19a is positioned in such a location that the electrode 19a makes a circuit, when the stylus 6b reaches the lead-out groove on a record disc having a diameter of 17 cm as placed on the turntable. Similarly, the electrode 19b is in operation when the stylus 6b arrives at the lead-out grooves on record discs as supported on the turntable which are 25 cm and 30 cm across. The electrode 19c corresponds to the lead-in groove on a record disc of a diameter of 17 cm. The electrode 19d corresponds to the lead-in groove on a 17 cm-diameter record disc. The electrode 19e corresponds to the lead-in groove on a record disc which is 30 cm across. The pin electrodes 19a through 19e are fixed in position by an insulating material on the surface 18a of the wall 18 and have lower ends projecting downwardly beyond the lower surface of the horizontal track channel 17. The projecting ends of the pin electrodes 19a-19e are soldered to a pattern of copper layer (not shown) on a printed circuit board 20 attached to the lower surface of the horizontal track channel 17.

A resilient electrode 21 is affixed to the rear end of the carriage 3 and has an angular portion exposed and projecting beyond the rear end of the carriage 3 for resilient slidable contact with the surface 18a of the wall 18 upon movement of the carriage 3. The resilient electrode 21 also has a portion wound as a coil fitted over a fixed pin 3b on the rear end of the carriage 3 for thereby positioning the resilient electrode 21. The resilient electrode 21 includes a hooked end 21a soldered to a power supply pattern of copper layer (not shown) on a printed circuit board 3c housed in the carriage 3.

When the carriage 3 is in a standby position, the linear tracking arm 6 is in the right-hand position as shown in FIG. 1. When the record disc 1 placed on the turntable has an outside diameter of 30 cm, a predetermined pushbutton (not shown) is depressed to give a setting for such a record disc size. Then, the pin electrodes 19b and 19e are electrically connected to an electric circuit in the printed circuit board 20. When the carriage 3 is moved to the left, the resilient electrode 21 is resiliently brought into contact with the pin electrode 19e while moving slidably on the wall surface 18a. A voltage is now applied from the power supply pattern on the printed circuit board 3c to the printed circuit board 20 through the resilient electrode 21 and the pin electrode 19e, whereupon the carriage 3 is stopped and the linear tracking tone arm 6 is lowered (as described in detail later on) to allow the stylus 6b to descend into the lead-in groove. Thereafter, the linear tracking tone arm 6 and hence the carriage 3 slowly moves leftward along the guide rod 5 under the control of a tracking error detecting unit (not shown). During such movement of the carriage 3, the resilient electrode 21 frictionally contacts the pin electrodes 19d, 19c. However, since the pin electrodes 19d, 19c are not electrically connected to electric circuits in the printed circuit board 20 at this time, the carriage 3 keeps on travelling without stopping at the pin electrodes 19d, 19c. When the resilient electrode 21 slidably moves into contact with the pin electrode 19b, then a voltage is applied from the power supply pattern on the printed circuit board 3c to the printed circuit board 20 through the resilient electrode 21 and the pin electrode 19b. The carriage 3 now stops its sliding movement, and the stylus 6b on the linear tracking tone arm 6 is lifted out of the lead-out groove on the record disc 1, as described later on. The linear tracking tone arm 6 is then caused to return to the starting position.

A mechanism for lifting and lowering the linear tracking tone arm 6 will now be described. The guide rod 5 is journalled at its ends in a pair of bearings 22a, 22b mounted on the platform 2 in spaced relation from each other. As shown in FIG. 3, the guide rod 5 has a slot 5a defined longitudinally in its lower portion. A rotation control arm 23 is connected to the guide rod 5 adjacent to the bearing 22a as shown in FIG. 4, and comprises a cylindrical body 24 fitted over the guide rod 23 and a limb 25 extending laterally from the cylindrical body 24. The cylindrical body 24 has on its inner periphey a ridge 24a fitted in the slot 5a in the guide rod 5. The limb 25 has on its intermediate position a spring 26a having one end fixed to a crank-shaped attachment 26 mounted on the platform 2. The limb 25 is normally urged by the spring 26a to move donwardly toward the platform 2. A plunger solenoid 27 is mounted on the platform 2 and has a plunger 28 with a return spring 28a wound thereon and retained by a pin 28b to normally urge the plunger 28 to move to the right as shown in FIGS. 1 and 4. An angle conversion cam 29 is pivotably mounted on a fixed pin 29a and includes a lever 29b loosely received in a slot 28c in the plunger 28 and pivotably mounted on the pin 28b on the plunger 28. The cam 29 also includes another lever 29c held in abutment against the limb 25 of the rotation control arm 23 to prevent the limb 25 from being angularly moved under the resiliency of the spring 26a.

When the plunger solenoid 27 is energized, the plunger 28 is pulled leftward (FIG. 4) against the the force of the return spring 28a to thereby turn the angle conversion cam 29 clockwise. The lever 29c of the cam 29 is lowered to allow the limb 25 to swing downwardly under the bias of the spring 26a, whereupon the guide rod 5 is angularly moved about its own axis in the direction of the arrowhead A. When the plunger solenoid 27 is de-energized, the plunger 28 returns to the right under the resiliency of the spring 28a causing the lever 29c of the cam 29 to turn the limb 25 upwardly against the force of the spring 26a. The guide rod 5 is now angularly moved about its own axis in the direction of the arrowhead B.

The plunger solenoid 27 responses quickly upon energization, and to dampen any impact which would be caused by violent actuation of the plunger 28, the journal in the bearing 22a is coated with viscous oil to permit the guide rod 5 to turn slowly and smoothly about its own axis.

The carriage 3 has an upper swing arm 30 composed of a cylinder 31 fitted over the guide rod 3 and a lever 32 projecting laterially from the cylinder 31. The cylinder 31 has on its inner periphery a ridge 31a loosely fitted in the slot 5a in the guide rod 5. The cylinder 31 is interposed between the supports 4a, 4a on the guide plate 4 mounted on the carriage 3. The lever 32 is in the form of a plate having a horizontal pin 32a partly embedded therein and extending over the linear tracking tone arm 6. The linear tracking tone arm 6 has on its intermediate upper surface a hook 6c extending in overhanging relation to the horizontal pin 32a for coaction therewith.

In operation, when the guide rod 5 is turned about its own axis in the direction of the arrowhead A (FIG. 4), the swing arm 30 is also turned in the same direction through interengagement between the slot 5a and the ridge 31a, thus lowering the lever 32. The linear tracking tone arm 6, which has been kept elevated by the pin 32a, is lowered in response to downward movement of the pin 32a to bring the pickup stylus 6b into the lead-in groove on the record disc 1. When the stylus 6b is placed on the record disc 1, the swing arm 30 is angularly positioned such that the pin 32a is spaced slightly from the hook 6c. Subsequently, the carriage 3 slowly moves slidably along the guide rod 5 to the left under the control of the tracking error detecting device. During this time, the swing arm 30 follows the movement of the carriage 3 as the cylinder 31 is interposed between the supports 4a, 4a and loosely fitted over the guide rod 5. When the stylus 6b reaches the lead-out groove on the record disc 1, the guide rod 5 is turned about its own axis in the direction of the arrowhead B in the manner described above. The swing arm 30 is also angularly moved in the direction of the arrow B to enable the pin 32a to lift the linear tracking tone arm 6 up to the initial position.

Since the swing arm 30 is supported on the guide rod 5, no load which would be exerted by the swing arm 30 is imposed on the carriage 3. With the swing arm 30 angularly movable through the guide rod 5, there is no need for a conventional swing plate which would otherwise be employed. Therefore, the tone arm lifting and lowering mechanism of the present invention is constructed of a reduced number of parts, leaving a wider space in the record player available for some other use. As the carriage 3 supports no plunger solenoid, the overall load on the carriage 3 is reduced which can therefore be driven with a smaller drive force. Elimination of lead wires for the plunger solenoid which would otherwise be installed on the carriage 3 results in simplified surroundings of the carriage 3.

The tracking error detecting device includes an optically coupled isolator 40 serving as a photointerrupter and comprising a light-emitting device and a photodetector which are spaced in confronting relation to each other. The linear tracking tone arm 6 has a laterally projecting light shield plate 6d which is movable transversely into and out of the path of light from the light-emitting device to the photodetector when the linear tracking tone arm 6 is moved laterally while the record disc 1 on the turntable is being played. Any tracking error which the pickup stylus 6b undergoes can be detected by changes in the amount of light that reaches the photodetector which are caused by lateral movements of the linear tracking tone arm 6. The carriage 3 is moved under feedback control for an interval based on the detected tracking error for record playing free from such tracking error.

As described above, the linear tracking tone arm 6 is lifted up to the initial position when the stylus 6b reaches the lead-out groove on the record disc 1. Since there is always a tracking error produced when the stylus 6b is guided into the lead-out groove, that is, since the stylus 6b is advanced radially inwardly when in the lead-out groove, such an amount of deviation of the stylus 6b must be eliminated to bring the linear tracking tone arm 6 back to the initial position which it assumed prior to being lowered onto the record disc 1.

Figure 6:
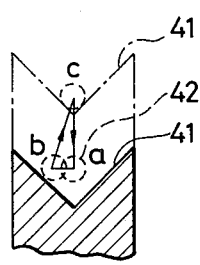
FIGS. 6 and 7 are schematic diagrams showing conventional tracking error correction mechanisms.

One conventional means for eliminating such a positional deviation is shown in FIG. 6. The illustrated means is incorporated in a tone arm lifting and lowering mechanism including a plunger solenoid mounted on a carriage. The plunger has on its distal end a V-shaped notch 41 in which there is disposed a pin 42 fixed to the linear tracking tone arm. When the plunger is actuated by the plunger solenoid, the V-shaped notch 41 is moved up and down to lift and lower the linear tracking tone arm. Upon arrival of the pickup stylus at the lead-out groove, there is a tracking error and hence the pin 42 which is aligned with the stylus is displaced from a position a in which there is no tracking error to a position b. As the V-shaped notch 41 is raised at this time, the pin 42 is elevated to a position c as it slides down a slanted surfaced of the V-shaped notch 41. The stylus then moves along the inclined path between the points b and c. During an initial stage of such movement, the stylus is caused to rub against a wall surface of the lead-out groove on the record disc. The rubbing movement of the stylus tends to damage the stylus and the sound groove, and produces noisy sounds unless the record player is equipped with a muting curcuit.

Figure 7:
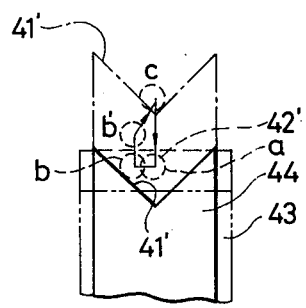

FIG. 7 illustrates a conventional arrangement for solving the foregoing problem. The arrangement separately includes means for lifting the linear tracking tone arm and means for correcting a tracking error produced. The lifting means comprises a lifter plate 43 for raising a pin 42′ attached to the linear tracking tone arm from a position b vertically to a position b′, and the correcting means comprises a correction plate 44 which is raised after the pin 42′ has been elevated to the position b′ for lifting the pin 42′ in a V-shaped notch 41′ from the position b′ to a higher position c. With this arrangement, the stylus is lifted at an initial stage vertically along the path from the position b to the position b′ so that no difficulty as described above will arise. However, a complex mechanism is required to be installed on the carriage for actuating the lifter plate 43 and the correction plate 44 neatly in timed relation, and hence the overall arrangement is costly to construct.

Figure 5:
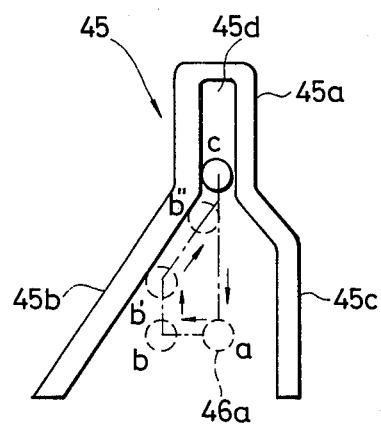
FIG. 5 is a tracking error compensator incorporated in the tone arm lifting and lowering apparatus of the present invention.

A tracking error correction mechanism according to the present invention is designed to obviate the above-mentioned difficulties. As illustrated in FIGS. 4 and 5, a guide frame 45 is mounted on an upper surface of the carriage 3 at its front end. The guide frame 45 inludes a channel portion 45a having a groove 45d therein, an oblique leg 45b and a bent leg 45c which extend downwardly from the channel portion 45a. The linear tracking tone arm 6 has an attchment plate 46 attached to a lateral side thereof and having on its distal end a pin 46a extending parallel to the linear tracking tone arm 6 into the guide frame 45.

The positional settings for the pin 46a are that the pin 46a is located at a point b (FIG. 5) when the stylus 6b is in the lead-out groove on the record disc 1. As the linear tracking tone arm 6 is raised to lift the stylus 6b off the record disc 1, the pin 46a moves upwardly along a vertical path b–b′ to allow the stylus 6b to ascend out of frictional contact with the walls of the lead-out groove. Therefore, the stylus and the lead-out groove are subjected to no damages, and no noisy sounds are emitted. When the linear tracking tone arm 6 is further lifted, the pin 46a is brought into abutting engagement with an inner surface of the oblique leg 45a and is slidingly guided up the latter to a position b″ and then is guided upwardly into the groove 45d until it reaches the original position.

The tracking error correction mechanism is simpler in construction than the conventional mechanisms as described above as it is composed only of the guide frame 45 mounted on the carriage 3 and the pin 46a attached to the linear tracking tone arm 6. The carriage 3 therefore supports a minimum number of parts thereon, and thus can be driven with a smaller force.

The simple tracking error correction mechanism of the present invention, particularly its guide frame 45 disposed on the carriage 3, has been made practically feasible by providing a wider space on the carriage 3 through the use of the swing arm 30 for lifting and lowering the linear tracking tone arm 6, not relying on a plunger solenoid which would otherwise be placed on the carriage 3.

Although a certain preferred embodiment of the present invention has been shown and described in detail, it should be understood that various changes and modifications may be made therein without departing from the scope of the appended claims.

What is claimed is:

1. An apparatus for lifting and lowering a linear tracking tone arm in a record player having a turntable, comprising:
   a platform;
   a guide rod mounted on said platform for angular movement about its own axis;
   a carriage slidably movable along said guide rod;
   a drive mechanism for driving said carriage along said guide rod;
   a linear tracking tone arm supported through a universal joint on said carriage and having a pickup stylus engageable in sound reproducing relation with a record disc placed on the turntable;
   an actuator mechanism mounted on said platform for turning said guide rod about its own axis;
   a swing arm slidably movable with said carriage along said guide rod and angularly movable with said guide rod, said swing arm being operatively connected with said linear tracking tone arm, whereby said linear tracking tone arm can be lifted away from the record disc or lowered against the record disc in response to angular movement of said swing arm caused by said guide rod turned about its own axis by said actuator mechanism;
   a guide frame mounted on said carriage, said linear racking tone arm having a pin movable in coaction with said guide frame for cancelling any tracking error which said pickup stylus undergoes when it is to be lifted off the record disc and for guiding said linear tracking tone arm to return tp a starting position, said guide frame including a channel portion having a groove therein, an oblique portion and a bent portion which extend from said channel portion toward said carriage, said pin extending longitudinally of said linear tracking tone arm into said guide frame, said pin being movable upon said stylus being lifted off the record disc for a first interval perpendicular to the record disc prior to engagement with said oblique portion and then for a successive second interval along said oblique portion into said groove until the pin reaches said starting position, whereby said stylus can be elevated out of a sound groove on the record disc without contacting walls of the sound groove while said pin travels through said first interval.

* * * * *